United States Patent
McCarthy et al.

(10) Patent No.: US 7,062,767 B1
(45) Date of Patent: Jun. 13, 2006

(54) METHOD FOR COORDINATING INFORMATION FLOW BETWEEN COMPONENTS

(75) Inventors: Dominic Paul McCarthy, Los Altos, CA (US); Jack Choquette, Mountain View, CA (US)

(73) Assignee: Raza Microelectronics, Inc., Cupertino, CA (US)

( * ) Notice: Subject to any disclaimer, the term of this patent is extended or adjusted under 35 U.S.C. 154(b) by 968 days.

(21) Appl. No.: 09/654,718

(22) Filed: Sep. 5, 2000

(51) Int. Cl.
*G06F 9/46* (2006.01)

(52) U.S. Cl. ...................... 718/102; 712/225

(58) Field of Classification Search ........... 718/100, 718/102; 712/28–30, 32, 220, 225, 245; 713/502

See application file for complete search history.

(56) References Cited

U.S. PATENT DOCUMENTS

| | | | | |
|---|---|---|---|---|
| 4,635,189 A | * | 1/1987 | Kendall | 707/10 |
| 4,980,824 A | * | 12/1990 | Tulpule et al. | 709/106 |
| 5,317,734 A | * | 5/1994 | Gupta | 395/706 |
| 5,408,658 A | * | 4/1995 | Rechtschaffen et al. | 712/216 |
| 5,644,749 A | * | 7/1997 | Obayashi | 711/220 |
| 5,754,781 A | * | 5/1998 | Kitta | 709/213 |
| 5,758,051 A | * | 5/1998 | Moreno et al. | 714/2 |
| 5,884,060 A | * | 3/1999 | Vegesna et al. | 712/215 |
| 5,926,474 A | * | 7/1999 | Bolosky et al. | 370/394 |
| 6,195,744 B1 | * | 2/2001 | Favor et al. | 712/215 |
| 6,212,623 B1 | * | 4/2001 | Witt | 712/216 |

* cited by examiner

*Primary Examiner*—William Thomson
*Assistant Examiner*—G. L. Opie
(74) *Attorney, Agent, or Firm*—IP Strategy Group, P.C.

(57) ABSTRACT

A method of efficiently coordinating the communication of data and commands between multiple entities in a system is disclosed. A transaction protocol enabling centralized scheduling of chains of data transfers in a system is disclosed.

25 Claims, 4 Drawing Sheets

Chained Command Sequence

System Architecture

Write Command

METHOD FOR COORDINATING INFORMATION FLOW BETWEEN COMPONENTS

FIELD OF INVENTION

The invention pertains to the field of coordination of the flow of data between components of an integrated system, particularly multi-step protocols used by systems with multiple functional units.

BACKGROUND

The ability to reduce the physical size of integrated circuits (chips) has led to more combinations of functions on a single chip. Design methodologies have arisen that teach combining pre-existing functional components using standardized bus-based interconnection techniques. These bus-based interconnection techniques are inherently inefficient and unable to scale as system complexity increases.

One limiting factor of bus-based interconnection techniques is bus contention. Bus contention occurs when multiple components attempt to use simultaneously a shared bus. Arbitration protocols determine the allocation of the shared bus. These allocation protocols are performed in real-time on demand. To avoid increasing the latency of access to the bus, the allocation protocols must be kept simple so that rapid computation is facilitated. Many allocation techniques are well known in the art, including: first-come first-served, round-robin, rate monotonic, various weighted prioritization schemes and others.

Another limiting factor of bus-based interconnection techniques is lack of scalability. There are two well-known techniques for scaling bus architectures.

One scaling technique is to increase the performance of a single bus through higher clock rates and increased width. This technique is expensive. The physical realization of a bus in a particular manufacturing process serves to place an upper limit on its clock rate. Additional performance increases require a wider bus, consuming greater amounts of expensive chip area. Furthermore, wide buses are ineffective on small transfers, serving to limit performance increases. An additional burden of this scaling technique is that every component connected to the bus requires redesign.

Another scaling technique is multiple buses. This technique is difficult in practice. A principal difficulty is scheduling transfers across the multiple buses. Similar to the case of a single bus, the scheduling algorithm must be simple in order to facilitate its computation to avoid introducing delay. The required simplicity of the algorithm reduces its effectiveness.

Another limiting factor in bus-based methodologies is the lack of a unified scheduling capability. The existing methodologies lack a coherent mechanism for an individual component to adapt its communication requirements to the capabilities of the system in which it is placed. System designers are forced to create ad-hoc mechanisms to regulate the communication demands of individual components and to integrate them into the overall system.

A communications technique is required that is efficient and scales well as system complexity increases.

SUMMARY OF THE INVENTION

An efficient technique is provided which moves the decisions about the scheduling of transfers from individual components with an arbitration mechanism to one or more centralized scheduling processors. Scheduling decisions are made in advance by the processors and then communicated to the participating components using a transaction protocol. The transaction protocol allows the scheduling processor to create chained sequences of transfers. The elements of each chained sequence can then be performed by the individual components without additional communication with the scheduling processor.

DETAILED DESCRIPTION OF THE PREFERRED EMBODIMENT

A method for coordinating information flow between components is disclosed. In the following descriptions, numerous specific details are set forth, such as the specific rendering of the implementation, in order to provide a thorough understanding of the present invention. It will be apparent, however, to one skilled in the art that the present invention may be practiced without these specific details. In other instances, well-known circuits, control logic and coding techniques have not been shown in detail, in order to avoid unnecessarily obscuring the present invention.

Figure 1:
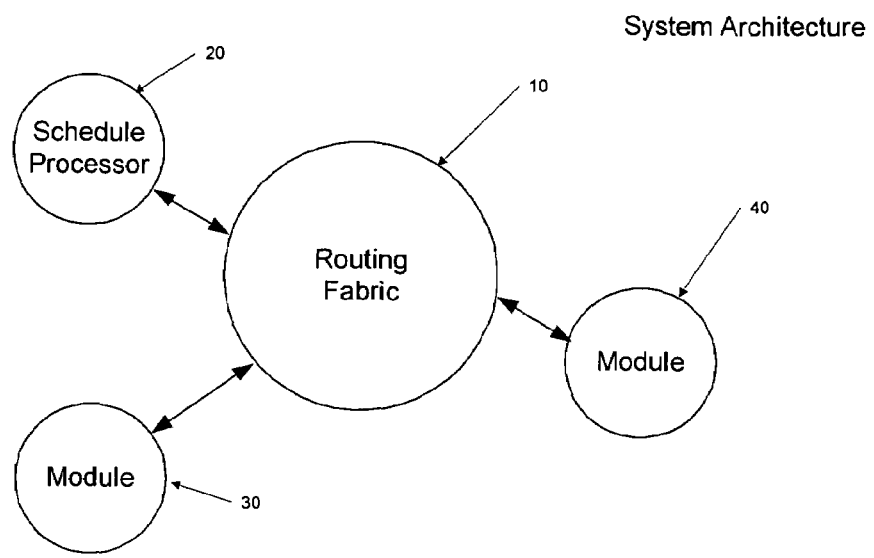
FIG. 1 illustrates the architecture of the communication system.

FIG. 1 depicts the architecture of a system. A plurality of components 20, 30 and 40 are connected to routing fabric 10. Routing fabric 10 provides the communication pathways between components 20, 30 and 40. In the preferred embodiment, routing fabric 10 is point-to-point, however, it can be constructed using any interconnection scheme. Interconnection schemes found in the art include shared bus, multiple shared buses, hierarchical buses, point-to-point, banyan tree and others. It should be understood that the principles of the disclosed invention are equally applicable to systems with more than three components and zero or more scheduling processors.

Components perform computations on data. Many forms of components are well known in the art including vector processors, MPEG encoders and decoders, audio decoders, graphics rasterizers, network processing engines, digital signal processing engines and others. Data and commands are transferred between components via routing fabric 10. Component computations and inter-component transfers are the principal system resources that must be scheduled for the system to operate efficiently. The usage of resources is directed by one or more centralized schedules. A centralizing schedule allows computations and transfers between multiple components to be optimized over a time horizon.

One or more of the components is given the responsibility of scheduling. In the preferred embodiment, component 20 performs the scheduling function in addition to any other computations and will be known as schedule processor 20. Schedule processor 20 determines the allocation of resources over a time horizon, creating a schedule. Schedule processor 20 may use any of the widely known scheduling methods including static, dynamic, adaptive, goal-directed, pre-emptive, rate monotonic and others. In the preferred embodiment, schedule processor 20 is a microprocessor executing a program. One alternate embodiment of schedule processor 20 is a state machine following one or more fixed schedules provided by a designer.

There are three types of commands: write, request for write, and wait for condition. Each command consists of a transfer of command information and, optionally, data between two components using routing fabric 10. Commands may instruct the receiving component to create and issue a subsequent command to a third component once the initiating command is completed. Commands may instruct the receiving component to perform computation. Commands may instruct the receiving component to perform computation and then issue a subsequent command. Components may receive multiple commands, storing them until they can be performed. All command transfers are unidirectional, allowing the sender to proceed without an acknowledgement from the receiver.

Figure 2:
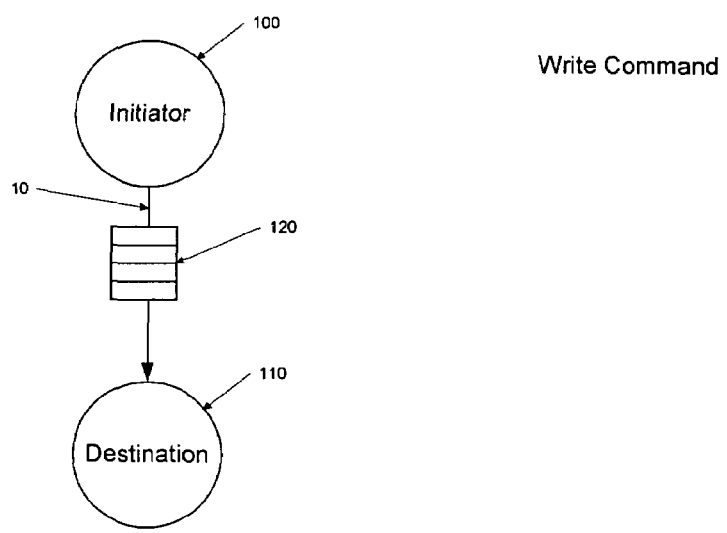
FIG. 2 illustrates a write command.

The write command moves data and/or status between two components. FIG. 2 illustrates the write command. Initiator component 100 sends write command 120 through routing fabric 10 to destination component 110. Write command 120 may convey any combination of data, status or instruction to perform computation to destination component 110.

Figure 3:
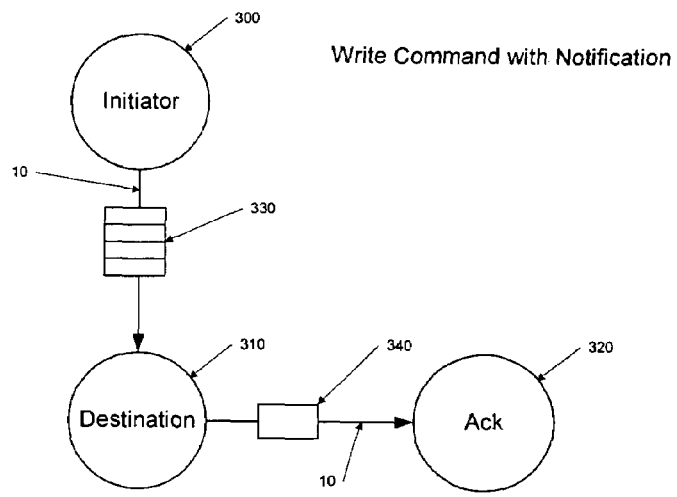
FIG. 3 illustrates a write command with notification command.

The write command may, upon completion, optionally generate a second write command. The second write command may be used to notify another component of the completion status of the first write command. FIG. 3 illustrates a write with notification sequence. Initiator component 300 sends the first write command 330 through routing fabric 10 to destination component 310. Upon completion of write command 330, destination component 310 sends the second write command 340 to acknowledge component 320 through routing fabric 10. It may be advantageous for acknowledge component 320 and initiating component 300 to be the same component.

Figure 4:
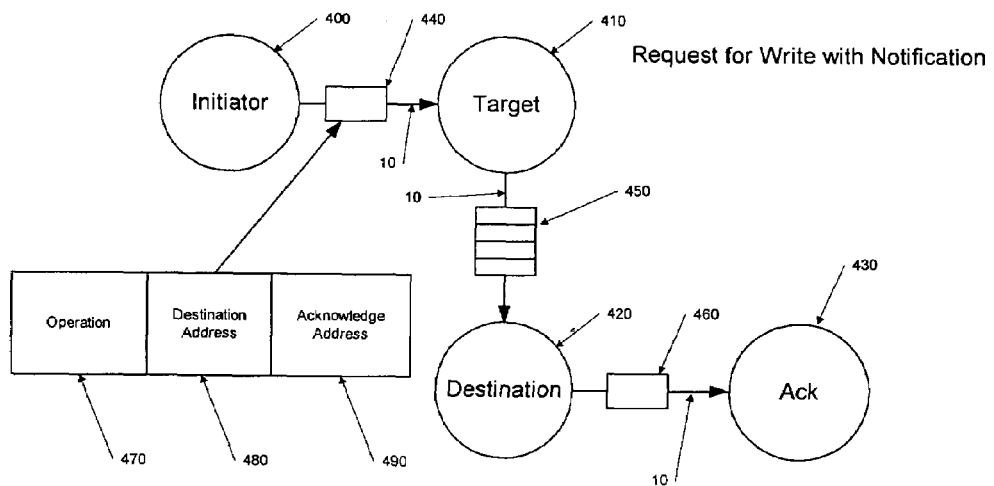
FIG. 4 illustrates a request for write with notification command.

The request for write command issued by an initial component instructs a second component to initiate a write operation to a third component. The completion of the write operation between the second and third components may request initiation of a notification write operation to a fourth component. FIG. 4 illustrates a request for write command sequence. Initiator component 400 sends request for write command 440 through routing fabric 10 to target component 410. Request for write command 440 contains at least operation 470, destination address 480, and optionally acknowledge address 490. Operation 470 directs target component 410 to send write command 450 to destination component 420 through routing fabric 10, using destination address 480. If notification was requested then upon completion of write command 450, destination component 420 sends notification write command 460 to acknowledge component 430 through routing fabric 10, using acknowledge address 490. This sequence does not require four different components: it is possible for one component to participate in the request for write sequence more than once. In some cases, destination component 420 is the same as initiating component 400. In other cases, acknowledge component 430 is the same as initiating component 400. Other combinations of a single component participating in a request for write command sequence more than once are possible.

Figure 5:
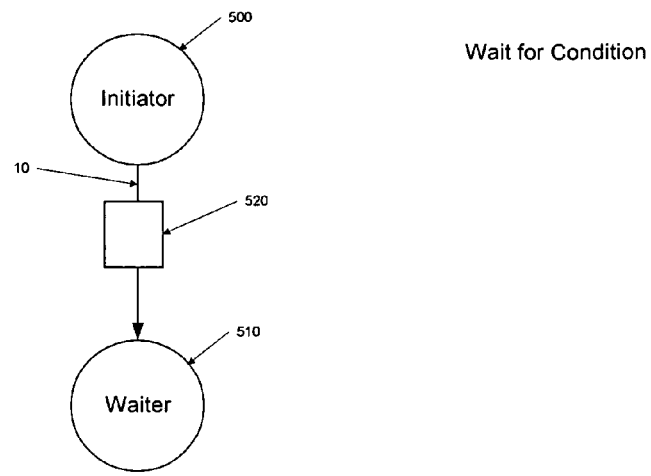
FIG. 5 illustrates a wait for condition command.

The wait for condition command issued by a first component instructs a second component to suspend processing until a specific condition occurs. Specific conditions to be awaited by a component include completion of component computation, receipt of a notification write command from another component, receipt of status from other specified components and others. FIG. 5 illustrates a wait for condition command. Initiating component 500 sends a wait for condition command 520 to target component 510 through routing fabric 10. Target component 510 suspends processing of commands until the condition specified in wait for condition command 520 is satisfied. Similar to the write command, the wait for condition command optionally initiates a status notification write operation to a third component (not shown).

Figure 6:
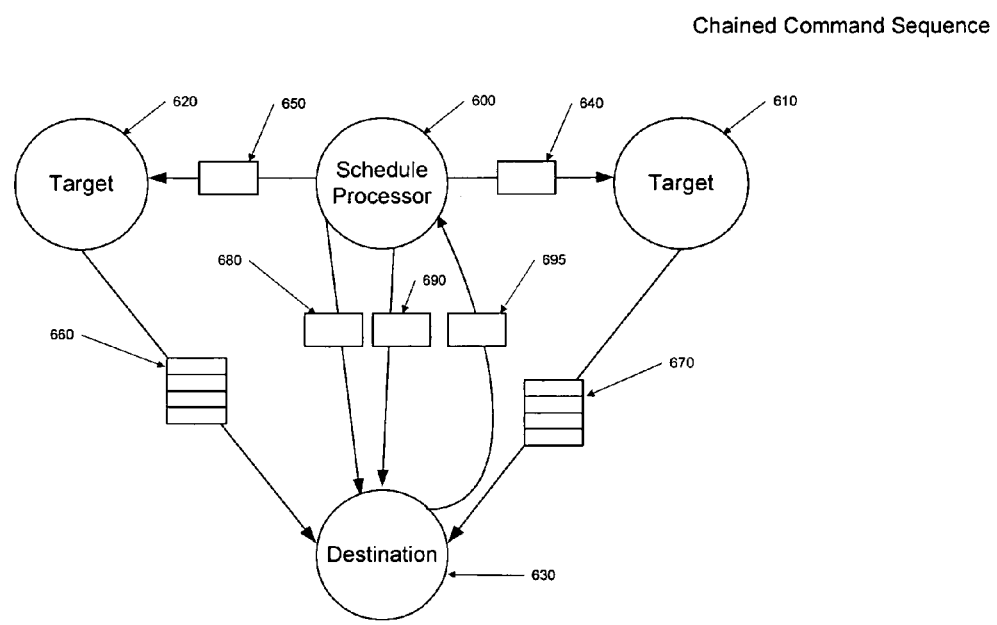
FIG. 6 illustrates a chained command sequence.

Chained sequences of computation by components and data transfer between components can be created by combining write, request for write and wait for condition commands. FIG. 6 illustrates a chained command sequence wherein two blocks of data residing in two components are transferred to a third component for computation. The computation will not begin until both blocks of data have been received. Schedule processor 600 issues four commands. First, request for write command 640 is sent to target 610. Request for write command 640 directs target component 610 to send write command 670 to destination component 630, providing one block of input data. Second, request for write command 650 is sent to target component 620. Request for write command 650 directs target component 620 to send write command 660 to destination component 630, providing the other block of input data. Third, wait for condition command 680 is sent to destination component 630. Wait for condition command 680 indicates that destination component 630 is to wait until the completion of write command 660. Fourth, wait for condition command 690 is sent to destination component 630. Wait for condition command 690 indicates that destination component 630 is to wait until the completion of write command 670, begin computation on input data, and send notification write operation 695 to schedule processor 600.

Due to the ability of components to store commands, Schedule processor 20 is able to issue all four commands without waiting for any of the specified operations to actually be started or completed. Immediately after issuing the four commands, schedule processor 20 can proceed with determining and specifying the next chain of commands to be scheduled. No further communication between schedule processor 20 and components 610, 620 and 630 is required to complete the chained sequence.

The chained sequence operates correctly regardless of the order of execution of the two write commands 660 and 670. This means that the chained sequence is insensitive to issues such as delay and jitter in routing fabric 10. Furthermore, the sequence operates correctly regardless of the sizes of the two blocks of data.

Figure 7:
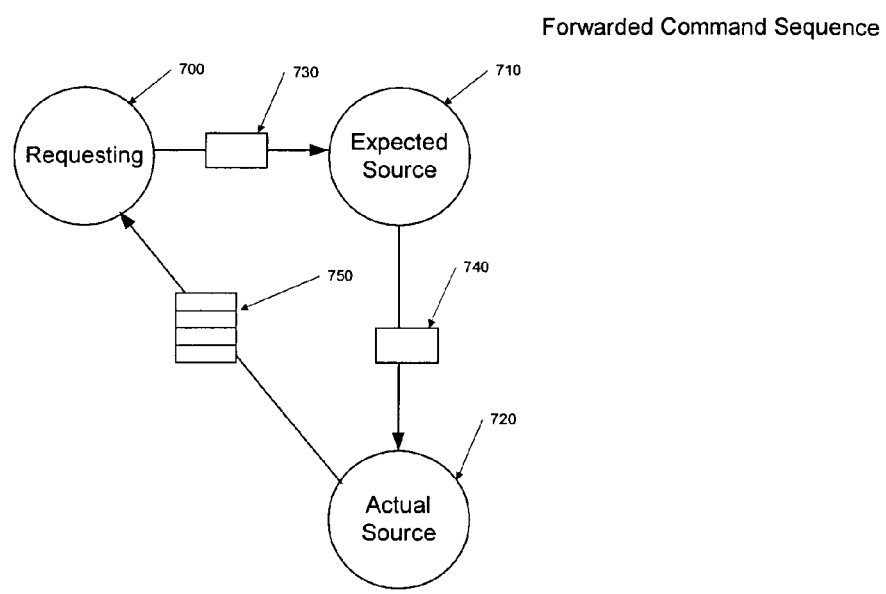
FIG. 7 illustrates a forwarded command sequence.

Another capability created by combining write and request for write commands is command forwarding. In command forwarding, a first component may receive a request for write command that it is unable to perform but which could be performed by a second component. The first component issues a second request for write command to the second component, directing the second component to supply the requested data in accordance with the first request for write command. FIG. 7 illustrates an example of command forwarding. Requesting component 700 issues a request for write command 730 to expected source component 710, specifying requesting component 700 as the destination of the write operation. Expected source component 710 determines that actual source component 720 is able to satisfy request for write command 730. Expected source component 710 issues request for write command 740 to actual source component 720, specifying requesting component 700 as the destination of the write operation. Actual source component 720 receives request for write command 740, subsequently issuing write command 750 to provide the requested data to requesting component 700.

Combinations of write, request for write and wait for condition commands, creating chained sequences of commands, provide schedule processor 20 with the capability of coordinating computations and inter-component data transfers in a system. Multiple chained command sequences can be issued and executed simultaneously in the system. Combining chained sequences of differing lengths and differing utilization of system resources to achieve system goals is a task for schedule processor 20. Command chaining reduces the amount of communication between schedule processor 20 and the components of the system. This reduction in communication allows a schedule processor more time to evaluate each scheduling decision or to scale to a larger number of components. Schedule processing need not be concentrated in a single component: it can be divided and distributed among other components in the system allowing further scaling.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specification and drawings are, accordingly, to be regarded in an illustrative, rather than a restrictive, sense.

What is claimed is:

1. A method for scheduling communication between a plurality of components in an integrated circuit (IC) coupled to at least one communication medium and at least one scheduling processor comprising the steps of:
    initiating a transfer by said at least one scheduling processor sending a transfer command to a first IC component;
    transferring data from said first IC component to a second IC component over said at least one communication medium;
    said second IC component notifying a third IC component upon completion of said transferring data step;
    wherein said transfer command to said first IC component identifies said second and said third IC components.

2. The method of claim 1 further comprising the steps of:
    initiating another transfer by said at least one scheduling processor sending a transfer command to a fourth IC component;
    transferring data from said fourth IC component to a fifth IC component;
    said fifth IC component notifying a sixth IC component upon completion of said transferring data step;
    wherein said transfer command to said fourth IC component identifies said fifth and said sixth IC components.

3. The method of claim 2 wherein said components include a microprocessor and said method further comprises the step of:
    said microprocessor executing program code.

4. The method of claim 3 further comprising the steps of:
    said at least one scheduling processor deciding an order to perform said transfers; and
    creating a chained sequence of said transfers.

5. The method of claim 2 further comprising the steps of:
    said at least one scheduling processor deciding an order to perform said transfers; and
    creating a chained sequence of said transfers.

6. The method of claim 1 wherein:
    said transfer command is communicated over a first medium; and
    said transferring step is performed over a second medium.

7. A method of controlling system operation between a plurality of components in an integrated circuit (IC) coupled to at least one communication medium and at least one scheduler comprising the steps of:
    said scheduler sending a first command to a first IC component to transfer data over said at least one communication medium;
    said at least one scheduler sending a second command to a second IC component to transfer data over said at least one communication medium;
    notifying said second IC component upon completion of said first command;
    initiating execution of said second command upon completion of said notifying step.

8. The method of claim 7 wherein said sending a first command and said sending a second command step can occur in any order.

9. The method of claim 8 wherein said method further comprises the step of:
    said at least one scheduler deciding an order to send said first command and said second command and creating a chained sequence of transfers.

10. The method of claim 9 wherein said at least one scheduler includes a microprocessor and said method further comprises the step of:
    said microprocessor executing a program.

11. The method of claim 9 wherein:
    said step of sending a first command is communicated over a first medium; and
    said step of sending a second command is communicated over a second medium.

12. The method of claim 9 further comprising the step of:
    transferring data from said first IC component over a first medium; and
    wherein said step of sending a first command is communicated over a second medium.

13. The method of claim 7 wherein:
    said step of sending a first command is communicated over a first medium; and
    said step of sending a second command is communicated over a second medium.

14. The method of claim 7 further comprising the step of:
    transferring data from said first IC component over a first medium; and
    wherein said step of sending a first command is communicated over a second medium.

15. A method of controlling system operation between a plurality of components in an integrated circuit (IC) coupled to at least one communication medium and at least one scheduler comprising the steps of:
    receiving a first command from said scheduler by a first IC component to transfer data over said at least one communication medium;
    receiving a second command from said scheduler by a second IC component to transfer data over said at least one communication medium;
    performing said first command;
    notifying said second IC component upon completion of said performing step; and
    initiating said second command upon completion of said notifying step.

16. The method of claim 15 wherein said receiving a first command, said receiving a second command, and said performing steps can occur in any order.

17. The method of claim 16 further comprising the steps of:
sending said first command by said at least one scheduler; and
sending said second command by said at least one scheduler.

18. The method of claim 17 wherein said at least one scheduler includes a microprocessor and said method further comprises the step of:
said microprocessor executing a program.

19. The method of claim 17 wherein:
said first command is communicated over a first medium; and
said step of performing said first command is performed over a second medium.

20. The method of claim 15 wherein:
said first command is communicated over a first medium; and
said step of performing said first command is performed over a second medium.

21. A method of controlling a system including a plurality of components in an integrated circuit (IC) coupled to at least one communication medium and at least one scheduler comprising the steps of:
said at least one scheduler receiving transfer requests from requesting IC components;
said at least one scheduler constructing a transfer command for each of said transfer requests;
said at least one scheduler sending said transfer commands to said requesting IC components;
wherein said transfer command further comprises;
(a) a destination address identifying a destination component; and
(b) a notification address identifying an acknowledge component.

22. The method of claim 21 wherein said at least one scheduler includes a microprocessor and said method further comprises the step of:
said microprocessor executing program code.

23. The method of claim 21 further comprising the steps of:
said at least one scheduling processor deciding an order to perform said transfers; and
creating a chained sequence of said transfers.

24. The method of claim 21 further comprising the step of:
transferring data from said requesting IC components over a first medium; and
wherein said step of sending said transfer commands is performed over a plurality of second medium.

25. The method of claim 21 further comprising the step of:
transferring data from said requesting IC components over a first medium; and
wherein said step of sending said transfer commands is performed over a plurality of second mediums.

* * * * *